J. S. HARDING.
BRAKE SLACK ADJUSTER.
APPLICATION FILED JUNE 13, 1913.
1,109,837.
Patented Sept. 8, 1914.
FIG. 1.
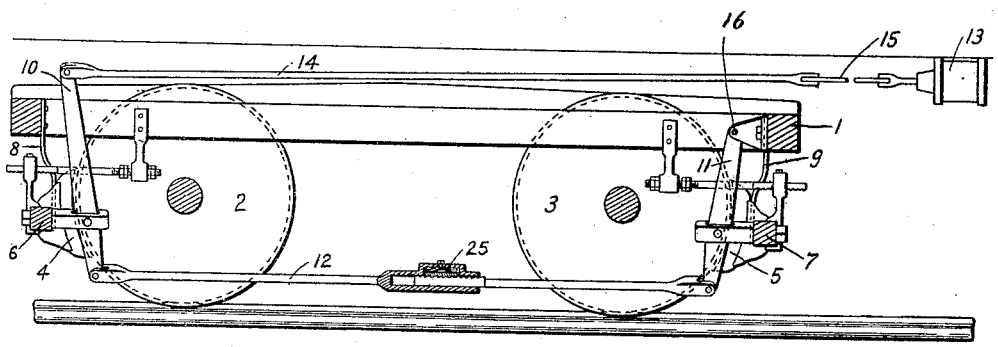
FIG 2.
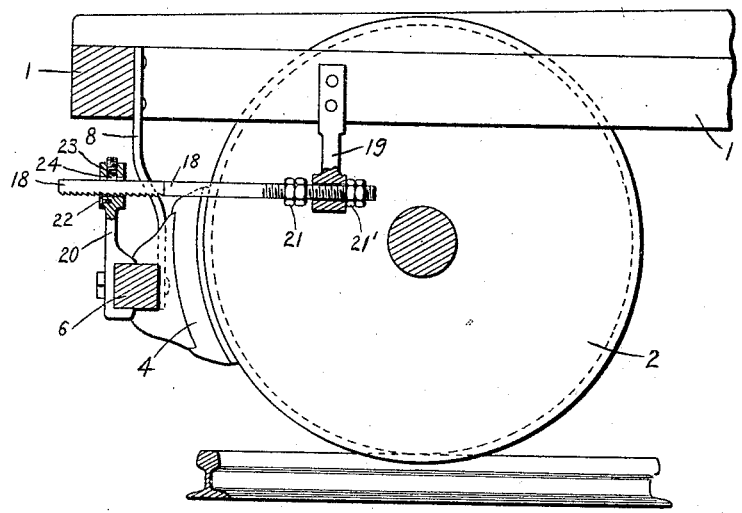
FIG 3.
FIG. 4.
WITNESSES
Joseph D. Ashe.
Elizabeth Morris
INVENTOR
Jesse S. Harding
BY Edwards Hand & Smith
ATTYS.
THE NORRIS PETERS CO., PHOTO-LITHO., WASHINGTON, D. C.

UNITED STATES PATENT OFFICE.

JESSE S. HARDING, OF STOUGHTON, MASSACHUSETTS, ASSIGNOR OF ONE-HALF TO CHARLES D. DYER, OF WHITMAN, MASSACHUSETTS.

BRAKE-SLACK ADJUSTER.

1,109,837.    Specification of Letters Patent.    Patented Sept. 8, 1914.

Application filed June 13, 1913. Serial No. 773,433.

*To all whom it may concern:*

Be it known that I, JESSE S. HARDING, a citizen of the United States, residing at Stoughton, county of Norfolk, State of Massachusetts, have invented an Improvement in Brake-Slack Adjusters, of which the following description, in connection with the accompanying drawing, is a specification, like characters on the drawing representing like parts.

My invention relates to an automatic brake slack adjuster for automatically taking up slack in a brake gear due to the wearing away of the brake shoes, and it has for its principal object to provide an improved device of this type which can readily be applied to the brake gear now commonly used with comparatively small structural changes.

The objects and nature of the invention will be hereinafter more fully disclosed and the novel features will be pointed out in the claims.

In the drawing: Figure 1 is a sectional view taken substantially on the longitudinal center line of a truck equipped with my device; Fig. 2 is a sectional view on an enlarged scale showing the take-up device; Fig. 3 is a detail sectional view of the adjustable connecting rod; Fig. 4 is a sectional view on the line 4—4 of Fig. 3.

Referring to the drawing in detail, 1 indicates one of the trucks of a car having the wheels 2 and 3 to which the brake shoes 4 and 5 are to be applied. These brake shoes are carried by brake beams 6 and 7 which in turn are supported in the usual way from the truck.

8 and 9 are the springs which are usually provided to move the brake shoes from the position of engagement with the wheels when the brakes are released.

The brakes are operated through the usual live and dead levers 10 and 11, connected by rod 12, the dead lever 11 being pivotally connected at one end to the truck as at 16, and the live lever being connected by connections 14 and 15 to a power piston operating in a cylinder 13 all as usual in air brake mechanism.

In my improved mechanism I provide a take-up device between each brake head and the truck by which lost motion due to the wear of the brake shoes is automatically taken up, and I also provide an automatic take-up device in the rod 12 which compensates for the change in the relative position of the brake heads due to such wear of the brake shoes, so that the correct relation is always preserved between the live and dead levers and the power piston to properly operate the brake mechanism. This take-up device comprises a take-up member 18 which is sustained at one end in a support in the form of a bracket 19 attached to the truck, said take-up member being slidably mounted in said bracket and provided with adjustable stops 21 and 21' to limit its movement. The other end of the take-up member is slidably supported by a bracket 20 which is rigid with the brake head, it being herein shown as secured to the brake beam, and is provided with ratchet teeth that coöperate with a tooth 22 on the bracket 20. The take-up member is held down in engagement with tooth 22 by the spring 23 and pusher 24. The tooth 22 on the brake member is preferably provided by securing a hardened steel insert to the bracket as in Fig. 2. Any equivalent pawl and ratchet device may be substituted to connect the brake beam and the take-up member, but I prefer that herein shown.

The connecting rod 12 is made automatically adjustable as shown in the drawing and comprising two telescoping parts the inner of which is provided with ratchet teeth which are engaged by a spring pressed ratchet toothed block 25 which is received in a recess in the outer member as clearly shown in Fig. 3. If the brakes are hung inside, the connecting rod is, of course, modified to withstand compression. It is, of course, immaterial whether the adjustment is made in the connecting rod or between the operating piston and live lever.

The connecting rod and the stops on the take-up member are so adjusted that when the operating piston is at one end of its stroke and the brakes are released one stop on each rod is engaged with the bracket 19 and when near the other end of its stroke, and the brakes are applied, the other end is near to or in engagement with the said bracket.

The operation of the device is as follows:—When power is applied to the live lever the brake shoes are drawn against the wheels, as is obvious upon inspection of Fig. 1. Owing to the special form of ratchet, the take-up member and the brake beam move forward together. The lost motion between the take-up member and the bracket 19 being normally sufficient to accommodate the entire movement of the brake shoe. When the brake shoes become worn, however, the increased movement which is necessary to bring the brake shoes into braking engagement with the wheels brings the stop 21 into contact with the bracket 19 thus preventing further movement of said take-up member, and during the continued movement of the brake beam the tooth 22 is carried over into the next notch of the take-up member. When the brake is released the springs 8 and 9 move the brake beams away from the wheels and because of the pawl and ratchet connections between the brake beams and take-up members, the latter are carried backwardly with the brake beams, the stops 21' limiting such movement of the take-up and brake beam. As the operating piston resumes its initial position the connecting rod 12 will be automatically shortened by the two parts thereof telescoping together, the block 25 operating to hold said parts in their newly adjusted position. This automatic adjustment will take place as often as it is necessary to compensate for the wearing away of the brake shoes.

While I have illustrated one embodiment of my invention I do not wish to be limited to the structural features shown.

Having described my invention, what I claim as new and desire to secure by Letters Patent is:

1. In combination, a truck, a pair of brake beams, a live lever connected to one brake beam, a dead lever connected to the other brake beam, a separate automatically adjustable take-up device for each brake beam, each take up device having a support for one end thereof in which limited reciprocatory movement is permitted, the other end of the take up device having a connection with the adjacent brake beam whereby these two parts will normally reciprocate together but upon excessive movement of the brake beam in one direction will take new positions relative to each other.

2. In combination with a truck, a pair of brake heads at each side of the truck, a live lever connected to one brake head, a dead lever connected to the other brake head, a separate automatically adjustable take-up device for each brake head, a bracket for each take up device depending from the truck and in which one end of the take up device is slidably mounted for limited reciprocatory movement relative to the truck, the other end of the take up device having a pawl and ratchet connection with the adjacent brake head whereby these two parts will normally reciprocate together but upon excessive movement of the brake head in one direction will take new positions relative to each other.

3. In combination, a truck, a pair of brake beams, a live lever connected to one brake beam, a dead lever connected to the other brake beam, an automatically adjustable rod connecting the levers, a separate automatically adjustable take-up device for each brake beam, each take-up device having a support for one end thereof in which limited reciprocatory movement is permitted, the other end of the take-up device having a connection with the adjacent brake beam, whereby these two parts will normally reciprocate together, but upon excessive movement of the brake beam in one direction will take new positions relative to each other.

4. In combination, a truck, a brake head provided with a brake shoe, a take up member, a support depending from the truck for one end of said take up device, in which support the take up device has limited reciprocatory movement, the other end of the take up device having a connection with the brake head whereby these two parts will normally reciprocate together, but upon excessive movement of the brake head in one direction will take new positions relative to each other.

In testimony whereof, I have signed my name to this specification, in the presence of two subscribing witnesses.

JESSE S. HARDING.

Witnesses:
GEORGE E. JOSEPH,
PATRICK MADDEN.